United States Patent [19]

Doddington et al.

[11] Patent Number: 4,977,598

[45] Date of Patent: Dec. 11, 1990

[54] EFFICIENT PRUNING ALGORITHM FOR HIDDEN MARKOV MODEL SPEECH RECOGNITION

[75] Inventors: George R. Doddington, Richardson; Basavaraj I. Pawate, Dallas, both of Tex.

[73] Assignee: Texas Instruments Incorporated, Dallas, Tex.

[21] Appl. No.: 337,608

[22] Filed: Apr. 13, 1989

[51] Int. Cl.$^5$ .............................................. G10L 7/08
[52] U.S. Cl. .................................................... 381/43
[58] Field of Search .................................... 381/41–46; 364/513.5

[56] References Cited

U.S. PATENT DOCUMENTS

| | | | |
|---|---|---|---|
| 4,783,803 | 11/1988 | Baker et al. | 381/43 |
| 4,829,575 | 5/1989 | Lloyd | 381/43 |
| 4,837,831 | 6/1989 | Gillick et al. | 381/43 |

Primary Examiner—Gary V. Harkcom
Assistant Examiner—John A. Merecki
Attorney, Agent, or Firm—L. Joy Griebenow; James T. Comfort; Melvin Sharp

[57] ABSTRACT

An efficient pruning method reduces central processing unit (CPU) loading during real time speech recognition by instructing the CPU to compare a current state's previously calculated probability score against a predetermined threshold value and to discard hypothesis containing states with probability scores below such threshold. After determining that the current state should be kept, the CPU is directed to locate an available slot in the scoring buffer where information about the current state is then stored. The CPU locates an available slot by comparing the current time-index with the time-index associated with each scoring buffer slot. When they are equal, the slot is considered not available; when the current time-index is greater, the slot is considered available. After the information about the current state is stored, the CPU then sets the current state's backpointer to point at the start state of the current best path if the current states represents a completed model. Regardless of the current state's status, the CPU then associates the current time-index with the time-indices of all the slots along the best path to the current state. The CPU then proceeds to calculate the probability score of the next current state and the method repeats until all states have been completed.

8 Claims, 4 Drawing Sheets

EFFICIENT PRUNING ALGORITHM FOR HIDDEN MARKOV MODEL SPEECH RECOGNITION

BACKGROUND OF THE INVENTION

1. Field of the Invention

This invention relates generally to computer processors, and more particularly to an efficient pruning algorithm which reduces computer processing unit loading during speech recognition.

2. Description of the Related Art

Previous Dynamic Time Warping (DTW) based speech recognizers have employed a traditional bottom up approach in which word-level or phonetic-level hypotheses were generated by an autonomous word hypothesizer. These hypotheses were then post-processed by a sentence-hypothesizer that used application specific knowledge (grammar) to choose the best sentence hypothesis from all grammatical candidates.

Recently, in "System and Method for Parsing Natural Language" (U.S. Pat. application Ser. No. 919,156) and "A Chart Parser for Stochastic Unification Grammar" (U.S. Pat. application Ser. No. 312,835), both assigned to the same assignee as the present application, a top-down approach to speech recognition is disclosed. Briefly, the word-hypothesizer is no longer autonomous but is guided by the sentence-hypothesizer. As a frame is processed, each active sentence hypothesis inquires for data as needed. The sequence of data requests typically begins with a sentence inquiring for word hypotheses, (i.e., a candidate word and the likelihood of its occurrence given the current history). These requests for a word hypothesis in turn request a phone hypothesis, and so forth. The process terminates with a request for a frame of speech data. At this point, the incoming frame of speech data is scored in the context predicted by this sentence hypothesis. Each level applies the constraints of grammar-like structures, or Hidden Markov Models (HMMs), to the next lower level of data representation.

FIG. 1, shows a block-diagram of such a layered grammar, or model-driven, approach to speech recognition. It has two principal features: a hierarchical structure that allows any number of levels of data representations to coexist and a continuous density HMM computational framework which governs the flow of information at all levels. The details of a system like that shown in FIG. 1 have been fully explained in "Chart Parser for Stochastic Unification Grammar" (U.S. Pat. application Ser. No. 312,835), assigned to the assignee of the present invention. It has been shown empirically that top-down hypothesizing provides a significant improvement in performance over previous bottom-up systems.

Unfortunately, the top-down model-driven approach used in the speech recognition scheme is computationally demanding in that it must operate in real time. Additionally a current speech recognition system needs a scoring buffer of several hundred kilobytes of data memory which is generally maintained in expensive fast random access memory. Therefore it is very desirable to reduce the amount of fast RAM used by a CPU, and thereby system expense, when processing a speech recognition algorithm.

SUMMARY OF THE INVENTION

In view of the above problems associated with the related art, it is an object of the present invention to provide a method for reducing central processing unit loading by efficiently pruning at two levels: by using a threshold score, and by affecting the state to which backpointers refer.

Another object of the present invention is to provide a method which operates in real time and which cost-effectively reduces the amount of fast RAM needed by a central processor when processing a speech recognition algorithm thereby minimizing compute cycle time.

Yet another object of the present invention is to provide a method which enable a central processing unit to quickly find available slots in a scoring buffer thereby also minimizing compute cycle time.

These objects are accomplished in a preferred embodiment by employing an algorithm which instructs the CPU to compare a current state's previously calculated probability score against a predetermined threshold value and to discard hypotheses containing states with probability scores below such threshold. After determining that the current state should be kept, the CPU is directed to locate an available slot in the scoring buffer where information about the current state is then stored. The CPU locates an available slot by comparing the current time-index with the time-index associated with each scoring buffer slot. When they are equal, the slot is not available; when the current time-index is greater, the slot is available.

After the information about the current state is stored, the CPU then sets the current state's backpointer to point at the start state of the current best path if the current state represents a completed model. Regardless of the current state's status, the CPU then associates the current time-index with the time-indices of all the slots along the best path to the current state. The CPU then proceeds to calculate the probability score of the next current state and the algorithm repeats until all states have been completed.

These and other features and advantages of the invention will be apparent to those skilled in the art from the following detailed description of a preferred embodiment, taken together with the accompanying drawings, in which:

DESCRIPTION OF A PREFERRED EMBODIMENT

The algorithm of the present invention can be implemented on any central processing system including multiple processing systems such as the Calypso, for example, developed by Texas Instruments, Incorporated. By employing the algorithm on a multiprocessor, one is able to partition the HMM layers across the multiple processors, thereby enabling speech recognition systems to recognize larger vocabularies.

Figure 1:
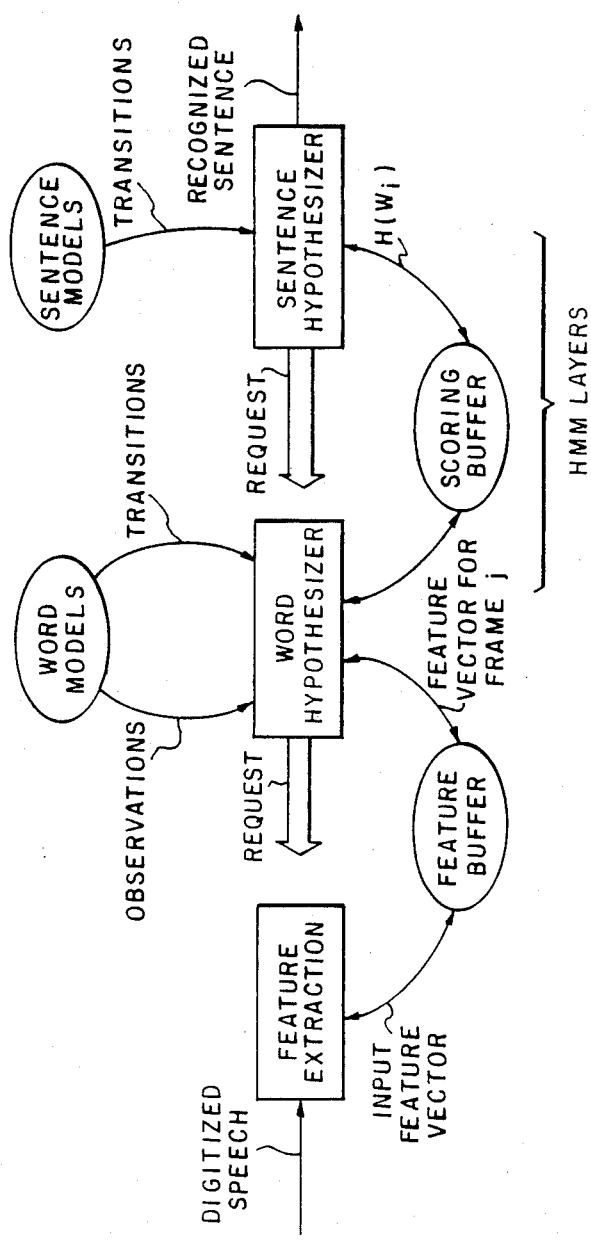
FIG. 1 is a block diagram of a layered grammar approach to speech recognition.
Figure 2:
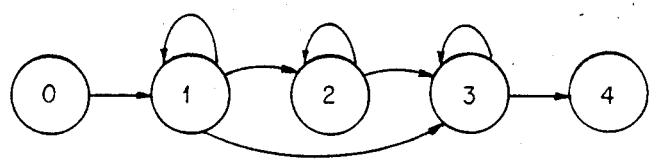
FIG. 2 is a typical flowchart representation of a left-to-right Hidden Markov Model.

FIG. 2 shows a typical representation of a left-to-right Hidden Markov Model (HMM). For this example, state 0 is the start state and state 4 is the top state. Given an observation sequence $S_o$, the problem is to find the single best state sequence for explaining the observed data. The Viterbi algorithm (G. David Forney, Jr., "The Viterbi Algorithm", Proc. of the IEEE, vol. 61, no. 3, March 1973) is used for finding this best state sequence. This is shown by $$\text{pathscore}_t(j) = \max[\text{pathscore}_{t-1}(i) + \ln(a_{ij})] + d_j$$
$$1 \leq i \leq n$$

$$\text{backpointer}_t(j) = \text{argmax}[\text{pathscore}_{t-1}(i)a_{ij} + \ln(a_{ij})]$$
$$1 \leq i \leq n$$

where
- $d_j$ = probability that state j matches the observation $S_o$ at time t,
- $a_{ij}$ = the transition probability from state i to state j,
- n = the number of states in the model.

Figure 3:
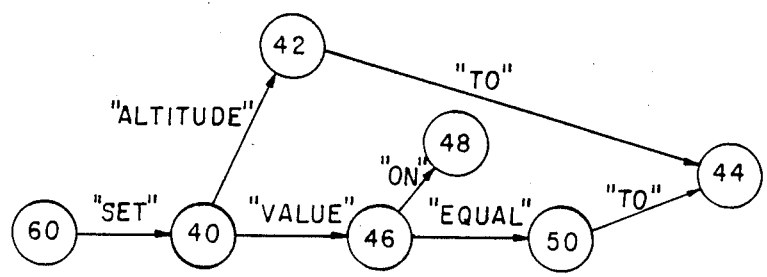
FIG. 3 is a flowchart example of top-layer state paths based on a typical sentence model.

A flowchart example of top-layer state paths based on a sentence model grammar is shown in FIG. 3. As the model is evaluated by the processor, different state paths, shown as branches, are hypothesized as possible, in light of the spoken input currently being processed and the various programmed grammars. The hypothesis branches shown are generated as a result of preprogrammed grammars or rules which specify only certain words may follow other words. The use of such rules is well known in the art and will not be explained here.

Figure 4:
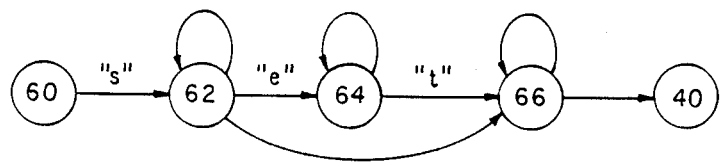
FIG. 4 is a flowchart example representation of state paths created for the sentence model of FIG. 3 which are based on a Hidden Markov Model.

FIG. 4 is an example representation of state paths created for the sentence model of FIG. 3, which are based on a Hidden Markov Model. HMMs are generally applied to layers of speech recognition grammar other than the top-layer sentence model, such as at the word- or phrase- level, and below. Also, it should be noted that although only two levels (FIGS. 3 and 4) are shown, the algorithm of the present invention can be expanded to include additional grammar layers all the way down to frame level HMMs. Additionally, preprogrammed rules also specify at this level which letters may follow other letters.

Looking now at both FIG. 3 and FIG. 4, a processor will calculate the beginning probability for node 60 (FIG. 3), which appears before the word "set". To determine whether the word "set" has been spoken, the processor passes this probability to the start state node 60 of FIG. 4 and begins to parse. As the processor determines that a letter has been spoken, it adds the probability of that letter being spoken to the already existing beginning probability. As each letter is determined to have been spoken, the processor continues to add probabilities until arriving at stop state node 40, where it has a total probability for having seen the word "set". At this time, the processor then passes this probability back to node 40 of FIG. 3.

The processor at this point indicates that it has probably seen the word "set" and generates two hypotheses as to what the next word might be: "altitude" or "value". The process of passing probability scores back and forth between different layers of the grammar proceeds until the entire spoken sentence is recognized. As indicated before, there can be many layers of grammar, with the processor passing probabilities clear down to the frame level and back up in its effort to recognize the continuous spoken input.

Figure 5:
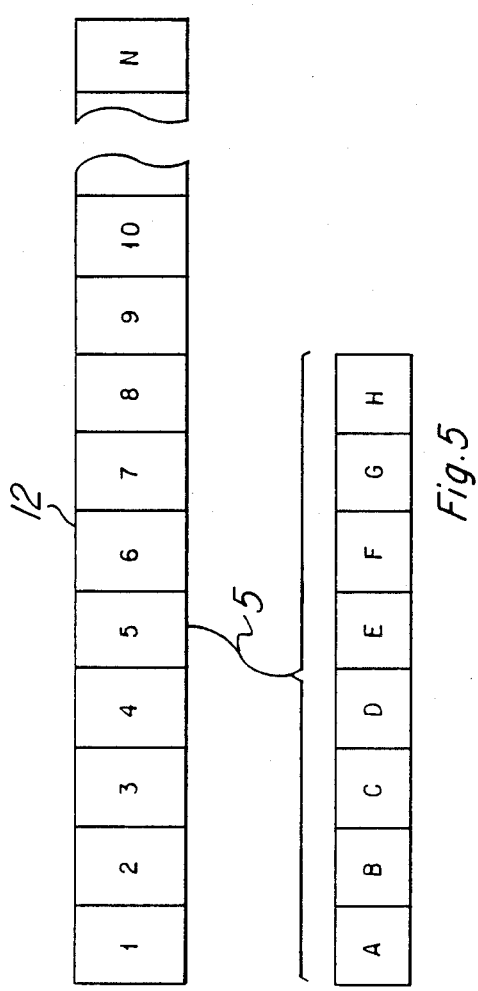
FIG. 5 is a block representation of a scoring buffer capable of employing the present invention.

Whenever a state, also known as a node, of a HMM has its probability calculated, it is considered to have been scored. The score is saved in a slot of a buffer in memory known as a scoring buffer 12. FIG. 5 shows such a scoring buffer 12 with N slots. Each slot stores the path score for a particular state, a back-pointer to its previous state and other ancillary information. A slot therefore store several 16-bit words of information. As an example, slot 5 is shown with eight 16-bit words of information A-H. One of the 16-bit words A-H indicates the slot's current time-index. Another word, for example word E, indicates the location of the slot in scoring buffer 12 containing information about the previous state. The information stored at word E is known as a back-pointer. The remaining words contain additional ancillary information such as best path probability score, etc.

In continuous word recognition, each HMM is scored several times for every input frame. As a result, depending on the complexity of the top layer sentence model of FIG. 3, scoring buffer 12 can occupy several hundred kilobytes, easily exceeding the data memory capacity of a typical central processing unit.

The various sentence-level hypotheses predicted must be stored in case the hYpothesis that starts out to have the best path probability is bypassed later by a competing hypothesis. During the first few words of a sentence, the number of competing hypotheses is high. A large amount of bookkeeping, and therefore a comparable amount of CPU memory, is required to manage these hypotheses. The present invention provides an accurate pruning technique to reduce these memory and CPU processing requirements, as demonstrated by the following discussion.

The algorithm of the present invention employs two levels of pruning. When certain best score sentence paths are found to have a high probability, the margin between the best and the next best sentence is typically large, and the number of active hypotheses can be trimmed based on their respective probability scores. Therefore the first level of pruning as embodied in the present invention involves computing a probability threshold as a fraction of the probability of the current most probable hypothesis. This is then normalized and set equal to −1. Hypotheses below this threshold are discarded.

For example, suppose sentence path 1 has the best path probability score of −0.2, sentence path 2 has a probability score of −0.5 and sentence path 3 has a probability score of −0.8. The best probability has the least negative value, so that −0.2 is a better probability than −0.5, therefore path 1 wins. If the operator sets the maximum difference between the best path score and the cutoff threshold equal to 0.4, the threshold cutoff value is −0.6, (−0.2−0.4=−0.6). Thus, the CPU will keep paths 1 and 2 and discard, or prune, path 3.

An example of the effect of the pruning threshold on the size of the scoring buffer needed (in terms of the number of slots) and the performance of the recognizer is shown in Table 1 below. As can be seen, with small vocabulary applications, such as continuous digit recognition, it has been empirically found that robust performance can be maintained with 2000 slots allocated for the scoring buffer. It should be noted, however, that the number of slots needed depends on the application involved.

TABLE 1

| Pruning Threshold and Memory Size | | |
| --- | --- | --- |
| Pruning Threshold | Number of Slots | Number of Errors |
| 15 | 650 | 76 |
| 20 | 1000 | 18 |
| 30 | 2000 | 10 |
| 40 | 3000 | 10 |

To further reduce CPU loading, a second level of pruning is employed by the present invention. This second level involves assisting the processor to quickly locate available slots in the scoring buffer and skipping the backpointer of a state within a model to its start state.

After determining that the current state should be kept, the algorithm of the present invention directs the CPU to locate an available slot in scoring buffer 12. According to a preferred embodiment of the present invention, the CPU locates an available slot by comparing the current time-index with the contents of the last-time field associated with each scoring buffer slot.

Each scoring buffer slot has two time fields, a creation-time field that contains the time-index at which the slot was created and a last-time field that contains the time-index of the best path on which this state lies. All slots on the best path have the same time-index value stored in their respective last-time fields and such value is equal to the current time index. A slot is said to be free, if the time-index contained in the last-time field is less than the value of the current time-index minus one.

Thus, the CPU can quickly locate an available slot by extracting (reading) only one word of a slot to compare the contents of a slot's last-time field with the current time-index. When a slot is found whose time-index is less than the value of the current time-index minus one, the CPU has located an available, or "free", slot. It will then proceed to overwrite the contents of the available slot with information concerning the current state, including its creation time-index and its last-time field time-index.

To prevent pruning of a slot in the best path, the current time-index has to be propagated to all slots in the best path. In other words, if the current state information is stored in a slot, the current time-index must be propagated back along all the slots comprising the best path leading to the current state's slot. However, this back-propagation of the time-index increases the CPU loading. The preferred embodiment of the present invention alleviates this loading by referring the backpointer of a state within a model to its start state.

Consider FIG. 3 again for example. If the processor determined that it had seen the word "equal", after storing the information concerning the current state or node 50 in an available slot, the processor would then propagate the current time-index back to the respective slots containing node 46, node 40 and node 60. At the word level of FIG. 4, the processor would only propagate the current time-index back to the respective slots containing nodes 40 and 60. Thus, even though the processor probably saw the word "set", the nodes by which the word "set" was parsed are not important, only the start and stop states or nodes.

Note that the best path of a sentence is of interest; not the best path within a word model. Thus within a model, where a majority of the CPU loading occurs, best path indices need not be propagated, back-propagation time is saved, and the compute cycle is thereby significantly shortened. Also note that because the processor does not back-propagate the current time-index to slots containing nodes 62, 64 and 66, these slots will not have updated time-indices located in their respective last-time fields equal to the current time-index, they will therefore be available for the processor when it is later looking for a free slot, thereby saving CPU memory and compute cycle time.

Figure 6:
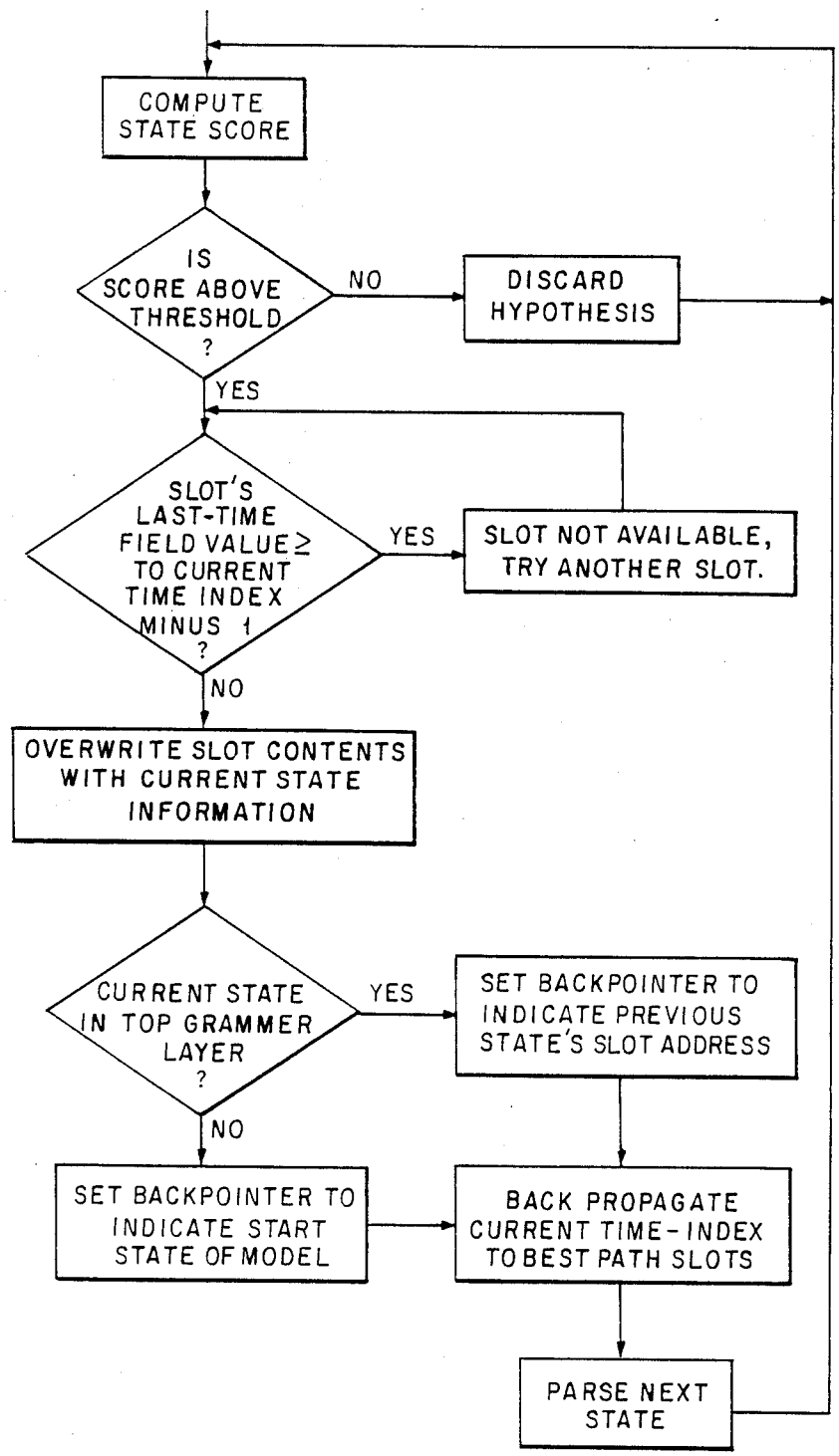
FIG. 6 is a flowchart of a preferred embodiment of the present invention.

FIG. 6 is a flowchart of a preferred embodiment of the present invention as discussed in detail above.

While a specific embodiment of the invention has been shown and described, various modifications and alternate embodiments will occur to those skilled in the art. Accordingly, it is intended that the invention be limited only in terms of the appended claims.

We claim:

1. A method for reducing loading of a central processing unit during speech recognition involving hierarchical layers of grammar and wherein models of those hierarchical layers employ a plurality of states including at least a start state and a stop state, only one of said plurality of states at any time being designated the current state, comprising:

(a) computing a score for the information-bearing current state;

(b) comparing said score against a predetermined threshold value to determine whether said information-bearing current state should be retained;

(c) locating an available slot in a scoring buffer having at least one slot;

(d) storing information regarding said current state in said available slot;

(e) setting a scoring buffer slot backpointer;

(f) assigning a last-time field value in said available slot equal to a current time-index of the central processing unit;

(g) propagating a time value equal to said current time-index back to all scoring buffer slots along a best path leading to said available slot containing information about said current state;

(h) parsing a next current state; and (i) repeating steps (a) through (h) until all states have been completed.

2. The method for reducing central processing unit loading of claim 1, said step (c) for locating an available slot further comprising:

(j) reading a slot's last-time field value;

(k) comparing said available slot's last-time field with said (l) indicating the slot is available if said current time-index minus one is less than said last-time field;

(m) passing over the slot if said current time-index minus one is greater than or equal to said last-time field; and (n) repeating steps (j) through (m) until an available slot is located.

3. The method for reducing central processing unit loading of claim 1, said step (b) for comparing said score against a predetermined threshold value, further comprising:

(o) if said score is greater than or equal to said predetermined threshold value, continuing on to step (c) of locating an available slot; and (p) if said score is less than said predetermined threshold, discarding said state and then returning to step (a) of computing a score for an information-bearing current state.

4. The method for reducing central processing unit loading of claim 1, said step (e) for setting a scoring buffer slot backpointer further comprising:
  (q) if said current state is from the top layer of a grammar, setting said backpointer to indicate a directly previous current state's scoring buffer slot address; and
  (r) if said current state is not from said top layer of a grammar, setting said backpointer to indicate said model's start state.

5. The method for reducing central processing unit loading of claim 1, said step (g) for propagating a time value equal to said current time-index back to all scoring buffer slots along the best path leading to said available slot containing information about said current state, wherein the location of said all scoring buffer slots along the best path leading to said available slot are indicated by said backpointer.

6. A method for efficient pruning during speech recognition, wherein said speech recognition involves using hierarchical layers of grammar and wherein models of those hierarchical layers involve a plurality of states including at least a start state and a stop state, only one of said plurality of states at any time being designated the current state, comprising:
  (s) computing the current state's score;
  (t) comparing said score against a predetermined threshold value, wherein if said score is greater than or equal to said predetermined threshold value, continuing on to step (u) and if said score is less than said predetermined threshold, discarding said state and returning to step (s);
  (u) locating an available scoring buffer slot;
  (v) storing information regarding said current state in said available slot;
  (w) setting a scoring buffer slot backpointer;
  (x) assigning a last-time field value in said available slot equal to a current time-index;
  (y) propagating a time value equal to said current time-index back to all scoring buffer slots along the best path leading to said available slot containing information about said current state, wherein the location of said all scoring buffer slots are indicated by said backpointer;
  (z) parsing a next current state; and
  (aa) repeating steps (s) through (z) until all states have been completed.

7. The method for efficient pruning of claim 6, said step (w) for setting a scoring buffer slot backpointer further comprising:
  (bb) if said current state is from the top layer of a grammar, setting said backpointer to indicate a directly previous current state's scoring buffer slot address; and
  (cc) if said current state is not from said top layer of a grammar, setting said backpointer to indicate said model's start state.

8. A method for improved speech recognition, said speech recognition using hierarchical layers of grammar and models of those hierarchical layers of grammar employ a plurality of states including at least a start state and a stop state, only one of said plurality of states at any time being designated the current state, comprising:
  (dd) computing said current state's score;
  (ee) comparing said score against a predetermined threshold value, wherein if said score is greater than or equal to said predetermined threshold value, continuing on to step (ff) and if said score is less than said predetermined threshold, discarding said state and returning to step (dd);
  (ff) locating an available scoring buffer slot;
  (gg) storing information regarding said current state in said available slot;
  (hh) setting a scoring buffer slot backpointer to indicate a directly previous current state's scoring buffer slot address if said current state is from the top layer of a grammar;
  (ii) setting a scoring buffer slot backpointer to indicate said model's start state if said current state is not from the top layer of said grammar;
  (jj) assigning a last-time field value in said available slot equal to a current time-index;
  (kk) propagating a time value equal to said current time-index back to all scoring buffer slots along the best path leading to said available slot containing information about said current state, wherein the location of said all scoring buffer slots are indicated by said backpointer;
  (ll) parsing the next current state; and
  (mm) repeating steps (dd) through (ll) until all states have been completed.

* * * * *